H. AUPERL.
AUTOMOBILE LOCK.
APPLICATION FILED OCT. 19, 1918.
1,316,407.
Patented Sept. 16, 1919.
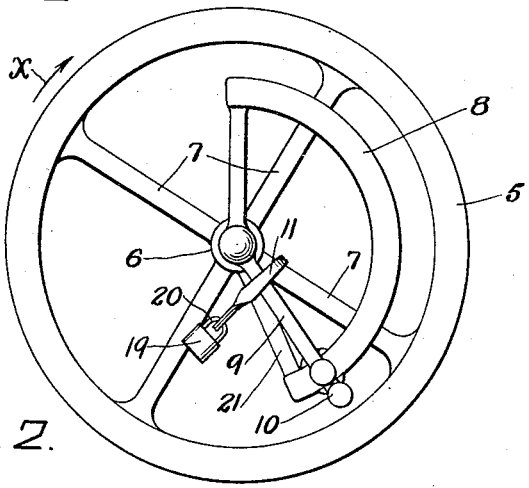
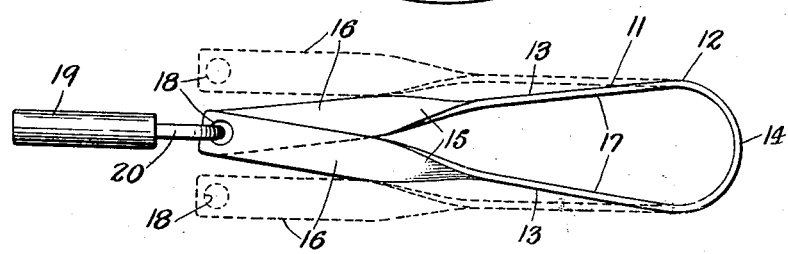
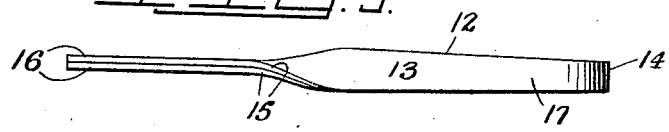
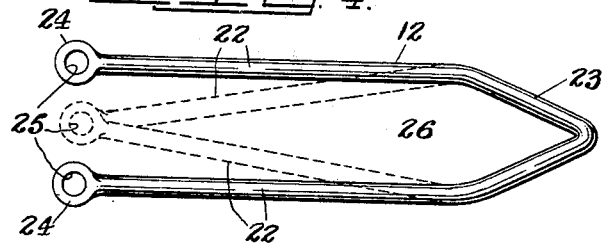
Inventor
Harry Auperl
By his Attorneys

UNITED STATES PATENT OFFICE.

HARRY AUPERL, OF NEW YORK, N. Y.

AUTOMOBILE-LOCK.

1,316,407. Specification of Letters Patent. Patented Sept. 16, 1919.

Application filed October 19, 1918. Serial No. 258,827.

*To all whom it may concern:*

Be it known that I, HARRY AUPERL, a citizen of the United States, and residing at New York, in the county of New York and State of New York, have invented certain new and useful Improvements in Automobile-Locks, of which the following is a specification, such as will enable those skilled in the art to which it appertains to make and use the same.

This invention relates to a lock device designed to lock an automobile to prevent the use thereof by thieves or other persons unauthorized to use the same; and the object of the invention is to provide a device of the class and for the purpose specified, which is designed to lock the steering wheel and the spark and gas advancing levers against movement, thus preventing the starting of the motor; and a further object of the invention is to lock the steering wheel in connection with said levers when said wheel is set to direct the car in a predetermined direction; and with these and other objects in view the invention consists in a device of the class and for the purpose specified, constructed and operating as hereinafter described and claimed.

The invention is fully disclosed in the following specification, of which the accompanying drawing forms a part, in which the separate parts of my improvement are designated by suitable reference characters in each of the views, and in which:—

Figure 1 is a plan view of a steering wheel of an automobile and showing my improved lock device in connection therewith;

Fig. 2 a detail view of the lock device as shown in Fig. 1 detached from the automobile and indicating its normal or unlocked position in dotted lines;

Fig. 3 a side edge view of a part of the lock device as shown in Fig 2; and,

Fig. 4 a view similar to Fig. 2 but showing a modification and omitting part of the construction shown in Fig. 2.

In Fig. 1 of the drawing I have shown at 5 the steering wheel of an automobile of any form and construction, which is secured to the upper end of the usual steering post 6 by means of a plurality of spoke members 7 in the usual manner, and mounted on the upper end of the steering post 6 and above the wheel 5 is a gas and spark lever quadrant 8, which is arc-shaped or approximately semi-circular in form. Rotatably mounted on the upper end of the steering post 6 are spark and gas levers 9 and 10 which coöperate with the quadrant 8 in the usual manner and as clearly shown in Fig. 1.

The construction above set out is similar to that usually employed in automobiles but is sometimes varied in the different types of vehicles, and, in the practice of my invention, I employ in connection with the steering wheel and spark and gas levers of cars of any form and construction a lock device 11 involving, in the form of construction shown in Figs. 1 to 3 inclusive, of a yoke-shaped member 12 having approximately similar side members 13 connected at one end by an arc-shaped cross head 14. The side members 13 are twisted approximately, centrally thereof, as shown at 15 to form end portions 16 in a plane at right angles to the other end portions 17 thereof, which end portions are preferably tapered from the center of the yoke-shaped device 12 to the cross head end 14 thereof, as shown in Fig. 3. The free ends of the end portions 16 are provided with apertures 18 which, when said end portions are brought together as shown in full lines in Fig. 2, are adapted to come in common alinement.

The lock device 11 also involves a padlock 19 having an arc-shaped shackle 20, which is adapted to be passed through the apertures 18 when the end portions 16 are brought together as indicated in full lines in Fig. 2, and in the use of my improved device the steering wheel 5 is preferably turned to the right, or in the direction of the arrow *x* of Fig. 1, bringing the front wheels of the vehicle into such position as to direct the car through a circular path if the vehicle be moved by any means whatever, but it will be understood that the front wheels of a car may be set to permit of the forward movement of the car only, in which position it would be impossible to turn corners as will be readily understood.

In the above operation of turning the steering wheel 5 in the direction of the arrow *x*, one of the spokes 7 of the wheel is brought into a position approximately similar to that shown in Fig. 1, and the spark and gas levers 9 and 10 are moved into the position shown in Fig. 1, or into the position to shut off the supply of gas as well as to retard the spark, after which the yoke-shaped device 12 is connected with said spoke, said levers and the part 21 of the quadrant 8 by first passing the spokes 7 into the yoke-shaped device 12 and then passing the levers 9 and 10 and the part 21 thereinto, after which the opposite sides 13 of the yoke-shaped device 12 are brought together as indicated in full lines in Fig. 2, and the padlock 19 or the shackle 20 thereof is passed through the apertures 18 to lock the separate parts 13 together in the position shown in Fig. 2, which operation will retain the spoke 11, levers 9 and 10, and the part 21 of the quadrant 8 within the yoke-shaped device 12.

With the wheel 5 and levers 9 and 10 locked in the manner above described it would be impossible to start the engine of the motor car, or to speed up the engine sufficiently to advance the car over the ground, and by reason of the setting of the front wheels of the vehicle even if it were possible to start the engine, or advance the car, the same could only be advanced through a predetermined pathway.

In Fig. 4 of the drawing I have shown a slight modification of the yoke-shaped member 12, which consists in forming said member out of rod-like material having approximately similar side members 22 connected at one end by a V-shaped cross head 23 and the free ends of the side members 22 are each flattened or provided with circular heads 24 having apertures 25.

The yoke-shaped device 12 as shown in Fig. 4 is preferably composed of heavy spring wire to permit of the springing of the side members 22 thereof together, as indicated in dotted lines in Fig. 4 to bring the apertures 25 in common alinement to permit the passage of the shackle of a pad or similar lock therethrough to lock the parts in such position. In this form of construction and when the yoke-shaped device 12 is in its locked position an approximately diamond-shaped space 26 is produced between the V-shaped cross head 23 and the side members 22 in which the spokes 7, levers 9 and 10 and the part 21 of the quadrant 8 are locked or retained.

It will be understood that the yoke-shaped device 12 shown in Figs. 1 to 3 inclusive is also made of spring material and the spring tendencies thereof are increased by the tapering of the cross head end 14 thereof, as clearly illustrated in Fig. 3, and while I have shown two forms of my improved yoke-shaped device for use in locking the spark and gas levers as well as the steering wheel of a motor car against usuage, it will be understood that my invention is not limited to these specific forms of yoke-shaped devices, and various changes therein and modifications thereof may be made, within the scope of the appended claims, without departing from the spirit of my invention or sacrificing its advantages.

Having fully described my invention, what I claim as new and desire to secure by Letters Patent, is:—

1. A lock device for use in connection with a steering wheel and spark and gas levers of a motor vehicle, comprising an elongated U-shaped member formed of resilient material and including similar opposite side members of approximately the same dimensions throughout their length, said side members being normally separated at their free ends and being adapted to be connected together to form a loop, the free ends being apertured and the axes of the apertures extending parallel to the axis of the loop, and a padlock device having its shackle passing through said apertures to lock the side members together.

2. A lock device comprising an elongated U-shaped member formed of a single piece of resilient strip metal and including a cross head and opposite side members, said side members being bent intermediate their length to place the free end portions thereof at right angles to the cross head and the free ends being normally separated, said free ends being apertured and being adapted to be connected together to form a loop, the axes of the apertures extending parallel to the axis of the loop, and means passing through said apertures for connecting the side members together.

In testimony that I claim the foregoing as my invention I have signed my name in presence of the subscribing witnesses this 17th day of October 1918.

HARRY AUPERL.

Witnesses:
C. E. MULREANY,
H. E. THOMPSON.

Copies of this patent may be obtained for five cents each, by addressing the "Commissioner of Patents. Washington, D. C."